United States Patent
Hogan et al.

(10) Patent No.: US 10,845,889 B2
(45) Date of Patent: Nov. 24, 2020

(54) SYSTEM AND METHOD FOR ENABLING COMMON KEYPADS TO BE USED AT DIFFERENT DISPLAY LOCATIONS

(71) Applicant: Caterpillar Inc., Deerfield, IL (US)

(72) Inventors: Lee M. Hogan, Champlin, MN (US); Nathaniel S. Doy, Maple Grove, MN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/256,080

(22) Filed: Jan. 24, 2019

(65) Prior Publication Data

US 2020/0241653 A1 Jul. 30, 2020

(51) Int. Cl.
*G06F 3/02* (2006.01)
*G06F 3/14* (2006.01)

(52) U.S. Cl.
CPC .......... *G06F 3/0227* (2013.01); *G06F 3/1423* (2013.01)

(58) Field of Classification Search
CPC .............................. G06F 3/0227; G06F 3/1423
See application file for complete search history.

(56) References Cited

U.S. PATENT DOCUMENTS

| 7,148,909 B2 | 12/2006 | Yui et al. |
| 7,310,776 B2 | 12/2007 | Mansell et al. |
| 9,438,706 B2 * | 9/2016 | Freund ................... G06F 1/1616 |
| 9,746,842 B2 | 8/2017 | Reese et al. |
| 2013/0296030 A1 * | 11/2013 | Arnone ..................... A63F 9/24 463/25 |
| 2014/0162759 A1 * | 6/2014 | Arnone ............... G07F 17/3227 463/24 |

FOREIGN PATENT DOCUMENTS

| CN | 1126337 | 7/1996 |
| CN | 102053712 | 2/2013 |
| CN | 103327686 | 9/2013 |
| CN | 106125716 | 11/2016 |

\* cited by examiner

*Primary Examiner* — Stacy Khoo
(74) *Attorney, Agent, or Firm* — Schwegman, Lundberg & Woessner

(57) ABSTRACT

A method for enabling use of a plurality of common keypads on a working machine is disclosed. The method can comprise: providing a controller, a plurality of displays and the plurality of common keypads for use with the plurality of displays on the working machine, the plurality of common keypads having a same hardware configuration and a same firmware configuration as one another; communicating between the controller, the plurality of common keypads and the plurality of displays using a common data link; and associating over the common data link, a one of the plurality of displays with at least one of the plurality of common keypads.

20 Claims, 3 Drawing Sheets

SYSTEM AND METHOD FOR ENABLING COMMON KEYPADS TO BE USED AT DIFFERENT DISPLAY LOCATIONS

TECHNICAL FIELD

The present application relates generally to methods and systems that enable the use of common keypads in working machines. More particularly, the present application relates to a system and method for connecting and calibrating common keypads sharing the same hardware and firmware at different display locations where the common keypads and display locations share a common data link.

BACKGROUND

Several types of working machines can include multiple displays as they require multiple personnel to operate them effectively. Such working machines include pavers or paving machines used in a paving process to create a new road surface. They also include cold planar machines that are configured to process paving material, such as by scarifying, removing, or reclaiming such material from the surface of a paved road. Pavers and cold planar machines, in particular, have multiple displays in various operator locations including a driver cabin, on at least one sides of the machine, etc. This arrangement allows personnel walking adjacent the machines to review and enter relevant data during machine operation. Thus, displays on these machines can be used simultaneously by multiple personnel including by the operator in the cabin and other personnel.

Typically, working machines that utilize multiple displays will have different keypads with different part numbers and a different source address for each of the multiple displays as the displays and keypads communicate on a common data link. As one can imagine, this arrangement contributes to larger part count than is desirable, installation challenges due to greater complexity, aftermarket technician challenges in obtaining a particular part and installing such part, etc.

Chinese Patent Application 1,126,337A discloses the use of a miniature computer with multiple display screens, touch panels and keyboards. This reference does not discuss such a system for use in working machines such as those of the present application but rather for use in stock transaction, teller transactions and industrial automation. Additionally, the 1,126,337A Application does not contemplate the use of a processor(s) associated with each display and does not contemplate dynamic communication between the multiple processors of the system over a common controller area network.

SUMMARY OF THE INVENTION

In one example, a method for enabling use of a plurality of common keypads on a working machine is disclosed. The method can comprise: providing a controller, a plurality of displays and the plurality of common keypads for use with the plurality of displays on the working machine, the plurality of common keypads having a same hardware configuration and a same firmware configuration as one another, communicating between the controller, the plurality of common keypads and the plurality of displays using a common data link, and associating over the common data link, a one of the plurality of displays with at least one of the plurality of common keypads.

In another example, a system for enabling use of a plurality of common keypads on a working machine is disclosed. The system can comprise: a working machine having a plurality of displays and the plurality of common keypads for use with the plurality of displays, the plurality of common keypads having a same hardware configuration and a same firmware configuration as one another; a common data link shared by the plurality of displays and the plurality of common keypads and a controller configured to communicate over the common data link with the plurality of common keypads and the plurality of displays, wherein the controller is configured to be calibrated to associate a one of the plurality of displays with at least one of the plurality of common keypads.

In another example, a non-transitory computer-readable storage medium storing a set of instructions that, when executed by at least one processor of a machine having a plurality of common keypads and a plurality of displays, the plurality of common keypads having a same hardware configuration and a same firmware configuration as one another, cause the machine to: receive, over a common data link shared by all of the plurality of common keypads and the plurality of displays, a calibration signal from one of the plurality of common keypads; recognize the calibration signal associated with one of the plurality of common keypads and one of the plurality of displays; save data regarding the association between the calibration signal and one of the plurality of common keypads; and enable use of one of the plurality of common keypads with one of the plurality of displays.

DETAILED DESCRIPTION

Figure 1:
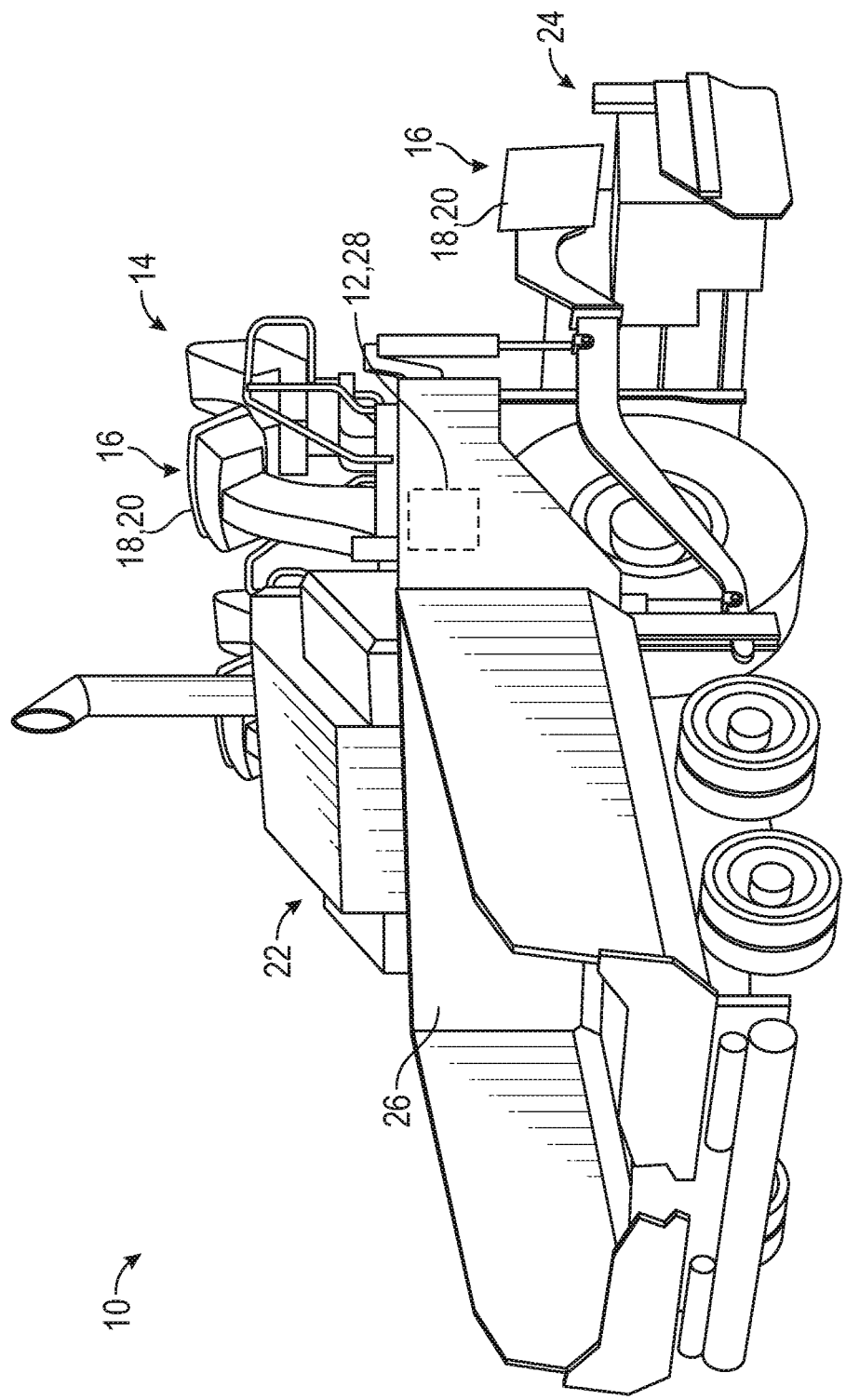
FIG. 1 is perspective view of an asphalt paving machine showing having multiple displays at different locations and a controller according to one example of the present application.

FIG. 1 is a schematic perspective view of asphalt paving machine 10 having a controller 12, operator station 14 and multiple operator console units 16. The multiple operator console units 16 can each include a display 18 and one or more associated keypads 20. Asphalt paving machine 10 can comprise vehicle portion 22, which can be connected to a screed system 24 via tow arm or other apparatus. The vehicle portion 22 can additionally comprise propulsion element such a motor or engine (not specifically numbered), conveyor system (again not specifically numbered), hopper 26 and elevator (not specifically numbered).

Loose paving material can be deposited onto work surface via a dump truck or other suitable means. The paving machine 10 can include means for moving loose paving material into the hopper 26, such as the elevator. Paving material can be asphalt, aggregate materials or concrete. In various embodiments, paving material can be deposited directly into hopper 26 of paving machine 10. Paving machine 10 can travel in direction, while conveyor system can move paving material in the opposite direction from hopper 26 to an auger system (not shown). Loose paving material can be deposited by conveyor system in front of the auger system. The auger system can disperse loose paving material along the width of screed system 24. Screed system 24 can compact loose paving material into a mat behind paving machine 10.

In order to facilitate formation of the mat, the paving machine 10 can be outfitted with a plurality of different sensor systems that communicate with the controller 12 to monitor operation of conveyor system, auger system and screed system, etc. By way of example, the paving machine 10 can be equipped with material flow sensors to monitor flow of paving material from auger system relative to screed system 24. These sensors can be positioned to monitor whether or not paving material is being adequately distributed across the width of screed system 24 by auger system between side plates of the screed system 24.

Typically, a paving machine will have several operators including at least one driving the paving machine 10 from the operator station 14. Additional operators can typically be positioned adjacent the screed system 24 to aid in operation of the paving machine 10. Operators can access, input and monitor information from the aforementioned sensors and other sensors such as those of the propulsion element, other vehicles in the work space, etc. via the multiple operator console units 16.

According to one example, the controller 12 can comprise an electronic control unit (ECU) 28 that can be part of the paving machine 10. The ECU 28 can be communicatively connected to the sensors previously discussed, can be communicatively connected to the operator display console units 16, and can also be connected to other electronic controls and/or additional sensors of the paving machine 10. Such communicative connections can be via a controller area network (CAN) data link also referred to as a common data link herein.

The ECU can be an embedded system that controls machine electrical and information systems and/or other subsystems of the machine. Types of ECUs include Electronic/engine Control Module (ECM), Powertrain Control Module, Transmission Control Module, Brake Control Module, Suspension Control Module, Information Control Module among other examples. In the case of industrial, construction, and other heavy machinery, example ECUs can also include an Implement Control Module associated with one or more implements coupled to and operable from the machine.

The example paving machine 10 may include, for example, the Engine Control Module (ECM) associated with the propulsion element, an Implement Control Module (ICM) associated with the various systems (conveyor system, auger system and screed system, etc.), a Transmission Control Module (TCM) associated with a transmission operatively coupled to the propulsion element, a Brake Control Module (BCM) associated with the braking system of the paving machine 10, and an Information Control Module (ICM) associated with the sensors and the operator display console units 16. These electronic modules/units can be communicatively connected and configured to send and receive data, sensor or other analog or digital signals, and other information between the various ECUs of the paving machine 10 including the ECU 28. Additionally, functions attributed to the ECU 28 or more generally to a controller of a work machine, can be distributed among multiple devices of the machine 10, including, for example, among the ECU 28 associated with the operator station 14, the operator display console units 16, an ECM associated with propulsion element, etc.

The ECUs and other electronic controls of the paving machine 10 including the operator display console units 16 can include software, hardware, and combinations of hardware and software configured to execute a number of functions attributed to the components in the disclosed examples. The ECUs or other electronic controls of machine 10 including the operator display console units 16 can be an analog, digital, or combination analog and digital controllers including a number of components. As examples, the ECUs and other electronic controls of machine 10 including the operator display console units 16 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

The ECUs and other electronic controls of machine 10 including the operator display console units 16 can include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, the ECU 28.

The ECUs and other electronic controls of the paving machine 10 including the operator display console units 16 can be configured to communicate with one another and with other components of machine 10 via various wired or wireless communications technologies and components using various public and/or proprietary standards and/or protocols. Examples of transport mediums and protocols for electronic communication between components of machine 300 include Ethernet, Transmission Control Protocol/Internet Protocol (TCP/IP), 802.11 or Bluetooth, or other standard or proprietary transport mediums and communication protocols.

Figure 2:
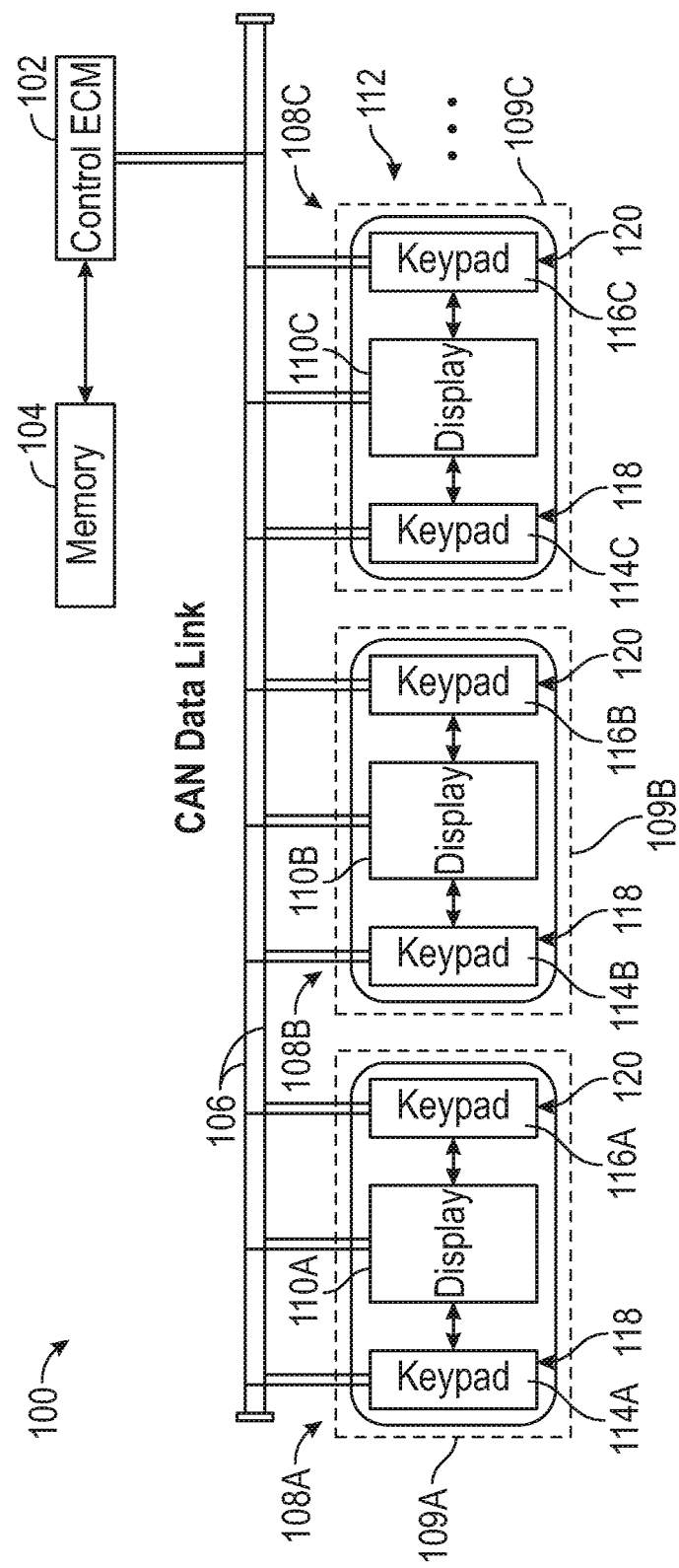
FIG. 2 is a schematic diagram of an example system for the paving machine including the controller, displays, a plurality of common keypads and a common data link shared between these items according to an example of the present application.

FIG. 2 is a schematic diagram illustrating an example system 100 for the paving machine 10. The system 100 can include a controller 102 (e.g., ECU 28 or controller 12 of FIG. 1), memory 104, a common data link 106 (CAN data link), and a plurality of operator display console units 108A, 108B, 108C, etc. As shown in the example of FIG. 2, the operator display console units 108A, 108B and 108C can each have a unit controller 109A, 109B and 109C, a display 110A, 110B and 110C and a plurality of keypads 112. The plurality of keypads 112 can include a first keypad 114A, 114B and 114C and a second keypad 116A, 116B and 116C.

The display 110A, 110B and 110C and the plurality of keypads 112 can have an associated unit controller 109A, 109B and 109C. By way of example, the display 110A and some of the plurality of keypads 112 can be configured for use with the unit controller 109A. Such process can be repeated with the display 110B and further of the plurality of keypads 112 and the unit controller 109B. Etcetera.

For each of the in the operator display console units 108A, 108B and 108C some of the plurality of keypads 112 can be housed in the operator display console units 108A, 108B and 108C adjacent one of the displays 110A, 110E and 110C. These some of the plurality of keypads 112 can be configured for use with one of the displays 110A, 110B and 110C such as to input or select information. The common data link 106 can communicatively connect the plurality of operator display console units 108A, 108B, 108C with one another and with the controller 102. Thus, the common data link 106 can facilitate communication on a single data link (i.e. a same communication bus) between the controller 102, unit controllers 109A, 109B and 109C, the plurality of keypads 112 and the plurality of displays 110A, 110B and 110C.

According to the example of FIG. 2, the first keypad 114A, 114B, 114C for the operator display console units 108A, 108B and 108C can have a same hardware configuration and a same firmware configuration as one another. Put another way, the system 100 includes a first plurality of common keypads 118 (first keypads 114A, 114B and 114C) that can have the same hardware configuration and the same firmware configuration as one another. Similarly, the second keypad 116A, 116B and 116C can have a same hardware configuration and a same firmware configuration as one another. The system 100 includes a second plurality of common keypads 120 (second keypads 116A, 116B and 116C) that can have the same hardware configuration and the same firmware configuration as one another. In contrast, the first keypads 114A, 114B and 114C can differ from the second keypads 116A, 116B and 116C by having a different hardware configuration and a different firmware configuration therefrom.

The above arrangements can reduce part count, reduce time and complexity for the installer or technician as will be discussed in further detail subsequently. The system 100 can be configured to associate over the common data link 106 a one of the plurality of displays (one of the plurality of displays 110A, 110B and 110C) with at least one of the plurality of common keypads (first keypads 114A, 114B and 114C or second keypads 116A, 116B and 116C). Put another way, the display 110A can be associated by the controller 102 with the first keypad 114A and/or the second keypad 116A for the operator display console unit 108A. Similarly, the display 110B can be associated by the controller 102 with the first keypad 114B and/or the second keypad 116B for the operator display console unit 108B and the display 110C can be associated by the controller 102 with the first keypad 114C and/or the second keypad 116C for the operator display console unit 108C.

As is further discussed in detail subsequently, the system 100 can be configured such that each display 110A, 110B, 100C, etc. can support a calibration in its menu structure to associate one or more of the plurality of keypads 112 therewith. One or more of the plurality of keypads 112 can be thus associated with a particular one of the displays 110A, 110B and 110C. Once so associated the keypad(s) 112 can be used for input and manipulation of the associated display, to grade control features, etc. from the common location (e.g., one of the operator display console units 108A, 108B and 108C). This way all of the plurality of keypads 112 and displays 110A, 110B and 110C on the common data link 106 can be used without having to program specific source addresses or use different data links for each of the plurality of keypads 112. Thus, in the example of FIG. 2, only two keypad part numbers, that of first keypads 114A, 114B and 114C and that of second keypads 116A, 116B and 116C, need be utilized for the system 100. Put another way, the system 100 allows all left keypads to use the same hardware and firmware, and all right keypads to use a same hardware and firmware. This can be made possible by use of dynamic CAN source addressing paired with the calibration discussed subsequently in regard to FIGS. 3 and/or 4.

In the configuration of the example of FIG. 2, the plurality of keypads 112 include a first group of common keypads (the first plurality of common keypads 118) and a second group of common keypads (the second plurality of common keypads 120). The first group of common keypads differ in a hardware configuration and a firmware configuration from the second group of common keypads. The system 100 (more particularly the controller 102) can associate over the common data link 106 one of the plurality of displays 110A, 110C or 110C with at least one of the first group of common keypads (the first plurality of common keypads 118) and at least one of the second group of common keypads (the second plurality of common keypads 118).

Thus, the system 100 can be configured so as to enable the use of the plurality of common keypads without programming specific source addresses or providing different data links for the plurality of common keypads. Additionally, as reviewed above, the for a particular one of the plurality of common keypads, one of the plurality of common keypads are calibrated so as to be associated by the controller with a particular serial number and one of the plurality of displays. For one of the plurality of common keypads, this can be calibrated by the controller recognizing a calibration signal associated with one of the plurality of common keypads and one of the plurality of displays. The system 100 can further save data regarding the association between the calibration signal and one of the plurality of common keypads. In some examples, the data can comprise the particular serial number of one of the plurality of common keypads.

The system 100 can include any additional hardware and/or software based on the needs of the specific working machine. For example, system 100 may include, among other things, implement actuators configured to control movement of implements included on the working machine, etc.

While illustrated as a single generic controller 102, system 100 may include any number of separate electronic control units including the unit controllers 109A, 109B and 109C. Each of the electronic control units can include software, hardware, and combinations of hardware and software configured to execute functions attributed to machine 10. As discussed previously, the controller 102 and/or the unit controllers 109A, 109B and 109C can include integrated circuit boards or ICB(s), printed circuit boards PCB(s), processor(s), data storage devices, switches, relays, or any other circuitry. Examples of processors can include any at least one of a microprocessor, a digital signal processor (DSP), an application specific integrated circuit (ASIC), a field-programmable gate array (FPGA), or equivalent discrete or integrated logic circuitry.

Memory 104 can be any volatile memory, non-volatile memory, or combination thereof. Memory 104 may be encoded with instructions that when executed by controller 102 causes controller 102 to perform various tasks, communicate, etc. Memory 104 may also store attributes of machine 10, inputs from the operator display console units 108A, 108B and 108C, etc. While illustrated as a single memory 104, system 100 can include any number of memories. For example, each control unit may include at least one dedicated volatile and/or non-volatile memories. Examples of non-volatile storage devices include magnetic hard discs, optical discs, floppy discs, flash memories, or forms of electrically programmable memories (EPROM) or electrically erasable and programmable (EEPROM) memories.

Examples of volatile storage devices include random access memories (RAM), dynamic random access memories (DRAM), static random access memories (SRAM), and other forms of volatile storage devices.

The controller 102 can be configured to communicate with other components of system 100 and machine 10 via the common data link 104. The common data link 104 can be implemented via various wired or wireless communications technologies and components using various public and/or proprietary standards and/or protocols. As further described in reference to FIG. 4, controller 102 can communicate via a J1939 address claim protocol common to systems relying on CAN datalink communications. J1939 address claim protocol is part of the SAE J1939 standard. Examples of transport mediums and protocols for electronic communication between components of machine 100 include Ethernet, Transmission Control Protocol/Internet Protocol (TCP/IP), 802.11 or Bluetooth, or other standard or proprietary transport mediums and communication protocols.

Figure 3:
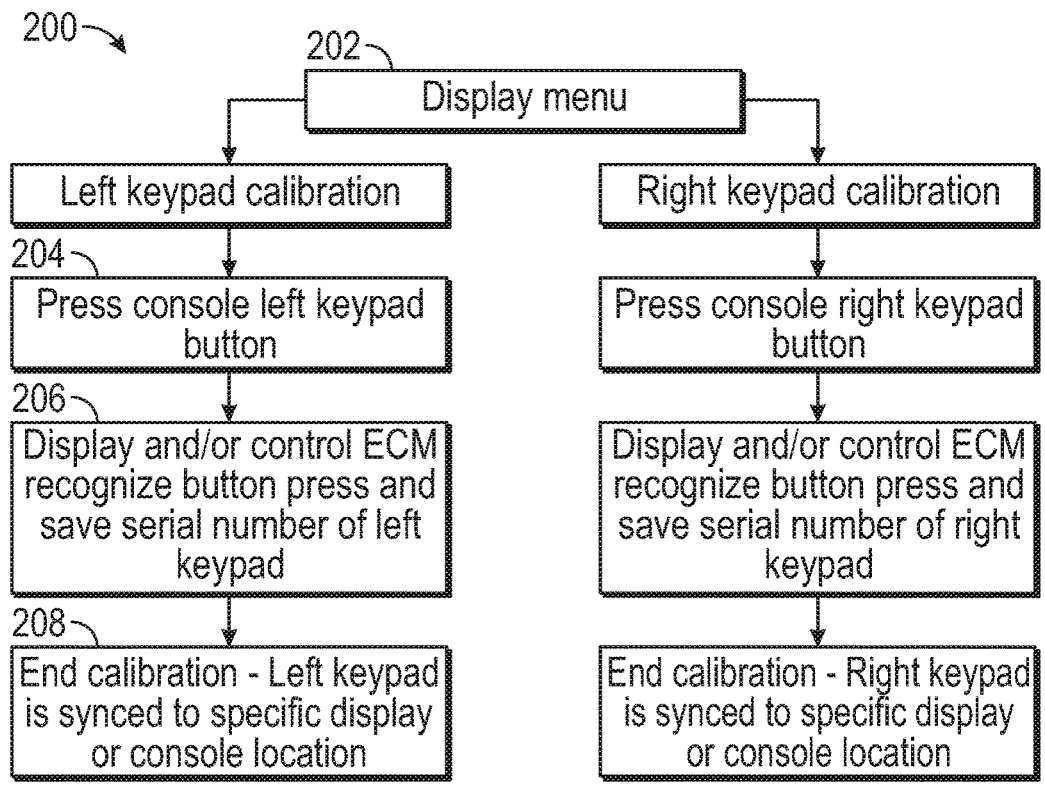
FIG. 3 is a flowchart of a method for enabling use of the plurality of common keypads on a working machine according to an example of the present application.

Turning to the FIG. 3, an example method 200 is illustrated for calibrating a left keypad and a right keypad for a single display. This method 200 can be applicable with any of the displays and keypads discussed previously herein. By way of example, the method 200 is described herein for the display 110A, the first keypad 114A and the second keypad 116A.

The method 200 can enable use of a plurality of common keypads on a working machine. The method 200 can include providing a controller (e.g., the controller 102, ECU 28 or controller 12 previously discussed), the plurality of displays (including the display 110A) and the plurality of common keypads (including the first keypad 114A and the second keypad 116A) for use with the plurality of displays on the working machine. As discussed previously, the plurality of common keypads can have a same hardware configuration and a same firmware configuration as one another.

The method 200 can communicate between the controller, the plurality of common keypads and the plurality of displays using a common data link as previously described herein. The method 200 can associate over the common data link, a one of the plurality of displays (the display 110A) with at least one of the plurality of common keypads (the first keypad 114A and the second keypad 116A).

The plurality of common keypads can include a first group of common keypads (to which the first keypad 114A belongs along with the first keypads 114B, 114C, etc.) and a second group of common keypads (to which the second keypad 116A belongs along with the second keypads 116B, 116C, etc.). The first group of common keypads can differ in a hardware configuration and a firmware configuration from the second group of common keypads. For the method 200, associating over the common data link one of the plurality of displays can include associating one of the plurality of displays with at least one of the first group of common keypads and at least one of the second group of common keypads. As with the systems described herein, for the method 200, enabling the use of the plurality of common keypads does not include programming specific source addresses or providing different data links for the plurality of common keypads.

For a particular one (e.g. first keypad 114A) of the plurality of common keypads, associating over the common data link can includes calibrating one of the plurality of common keypads so as to be associated by one of the plurality of displays (e.g., display 110A) or the controller with a particular serial number and one of the plurality of displays. In some examples the display and not the controller can be configured to associate the keypads to its own location. If the display does the calibration, the display can send the data to other ECM's which might require such information. Likewise, if the controller ECM does the calibration, the controller ECM can send the data to other ECM's which might require the display/keypad pairing/calibration information.

An example of such a process is shown in FIG. 3. The method 200 of calibrating includes opening a menu of one of the plurality of displays 202, actuating one of the plurality of common keypads to communicate a calibration signal over the common data link 204, recognizing the calibration signal associated with one of the plurality of common keypads and one of the plurality of displays 206 and saving data regarding the association between the calibration signal and one of the plurality of common keypads 208. This process can be repeated for the second keypad 116A as illustrated in FIG. 3. As illustrated in FIG. 3, the data can comprise the particular serial number of one of the plurality of common keypads.

Figure 4:
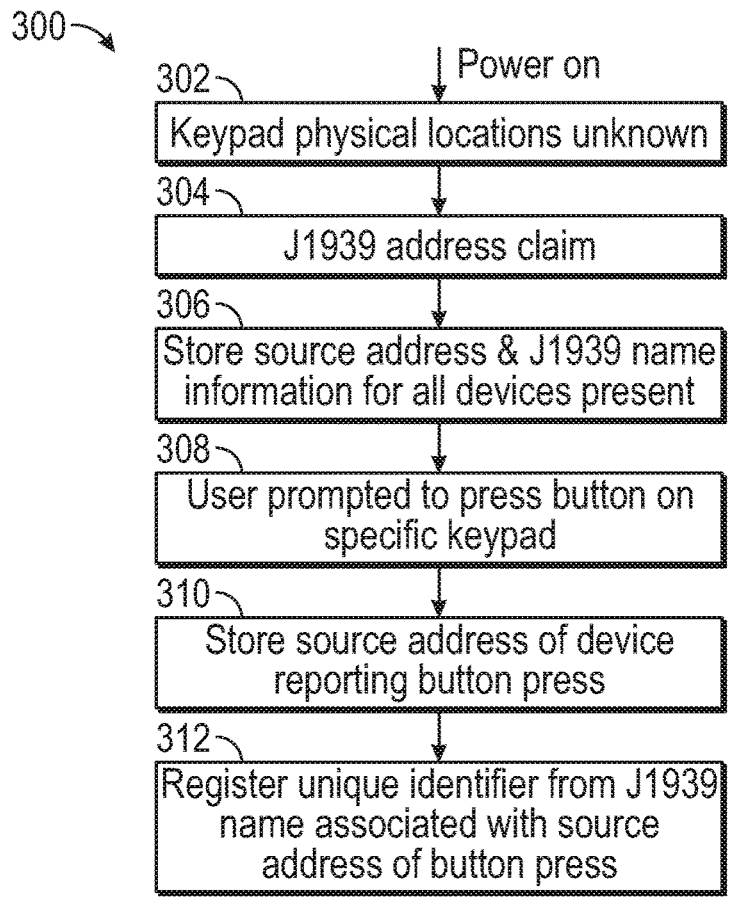
FIG. 4 is a flowchart of a further method for enabling use of the plurality of common keypads on a working machine according to an example of the present application.

FIG. 4 illustrates another exemplary method 300 of calibration. The method 300 at initial state prior to calibration can warn the user a keypad calibration is required via a pop up, all keypad backlights and indicators could be unlit, or another method, for example. A J1939 address claim is one protocol common to systems relying on CAN datalink communications and is part of the SAE J1939 standard. As part of this protocol, basic information is shared regarding the devices present on the CAN datalink. Each message in J1939 must be from a specific source, which is commonly referred to as the source address. The J1939 name contains additional information regarding what type of device is utilized. This can be an identifier such as a shared identifier, a semi-unique identifier, unique identifier, serial number, date code, or similar, for example. This identifier is guaranteed unique, such that no two devices, even with identical firmware, will have the same identifier. Additionally, no two devices on a given common data link are allowed to have the same source address, and the source address can be constant for a given "session". This information can be stored by the processor.

FIG. 4 shows the initial calibration process where initially keypad physical locations 302 are unknown. However, a J1939 address for the keypad would be known 304 and can be stored 306 by the processor. According to the method 300, the user can then navigate to a calibration wizard/routine/screen, and can prompted to press a button on a specific keypad 308. That button press can be transmitted via the CAN datalink to the display the user is using. Since the message can be from a specific source address, that source address can be mapped back to a unique identifier from the address claim. This unique identifier can be stored 310 and can be associated with a physical keypad location, and source address may no longer matter 312.

INDUSTRIAL APPLICABILITY

Example machines in accordance with this disclosure can be used in a variety of industrial, construction, commercial or other applications including paving and paving removal. Such machines can have multiple displays with associated keypads. In typical current practice, and installer or technician needs to install common keypad hardware and software onto the machine with multiple displays. Each display needs to be associated with only the appropriate keypads in the corresponding display housing. Because it is desirable to have all keypads on a same communication bus, one solution has typically been the practice to provide each keypad with a different hardware and firmware configuration. Another solution is to program specific source addresses for all the keypads. Yet a further solution has been to add "location code" or "function instance" pins to the hardware. This would mean the combination of inputs (usually either grounded or open) on these pins would determine the source address chosen by the keypad. Each keypad location would have a separate specific combination of these location code pins.

However, such practices can lead to a large number of part numbers for keypads if a number of displays are utilized or to programming challenges. This can lead to installation challenges due to greater complexity and aftermarket technician challenges in obtaining a particular part and installing such part, etc. For example, with "location code" or "function instance" this method is it requires physical inputs, which adds to the wiring harness size, cost, complexity, and failure modes, and also adds component cost. The problem is exacerbated by the relatively large number of operator stations required on some types of working machines such as those contemplated herein.

The present application avoids such complexity as it provides for systems and methods that enable use of a plurality of common keypads (having a same hardware configuration and a same firmware configuration) on the working machine. For example, the method 200 can include providing a controller (e.g., the controller 102, ECU 28 or controller 12 previously discussed), the plurality of displays (including the display 110A) and the plurality of common keypads (including the first keypad 114A and the second keypad 116A) for use with the plurality of displays on the working machine. The method 200 can communicate between the controller, the plurality of common keypads and the plurality of displays using a common data link as previously described herein. The method 200 can associate over the common data link, a one of the plurality of displays (e.g., the display 110A) with at least one of the plurality of common keypads (the first keypad 114A and the second keypad 116A). As discussed herein, the display 110A can support a calibration in its menu structure to associate multiple keypads to the display 110A. This way all keypads and displays on a common data link can be used without having to program specific source addresses or use different data links. Using the present systems and methods, the overall amount of part numbers can be reduced (as one or more common keypads can be utilized across displays) and programming challenges also reduced.

The above detailed description is intended to be illustrative, and not restrictive. The scope of the disclosure should, therefore, be determined with references to the appended claims, along with the full scope of equivalents to which such claims are entitled.

What is claimed is:

1. A method for enabling use of a plurality of common keypads on a paving machine, the method comprising:
providing a controller, a plurality of displays and the plurality of common keypads for use with the plurality of displays on the paving machine, wherein at least one of the plurality of displays and at least one of the plurality of common keypads are located in a driver cabin of the paving machine and at least another of the plurality of displays and at least another of the plurality of keypads are located on a side of the paving machine, the plurality of common keypads having a same hardware configuration and a same firmware configuration as one another;
communicating between the controller, the plurality of common keypads and the plurality of displays using a common data link; and
associating over the common data link, a one of the plurality of displays with at least one of the plurality of common keypads.

2. The method of claim 1, wherein the plurality of common keypads include a first group of common keypads and a second group of common keypads, and wherein associating over the common data link one of the plurality of displays includes associating one of the plurality of displays with at least one of the first group of common keypads and at least one of the second group of common keypads.

3. The method of claim 1, wherein enabling the use of the plurality of common keypads does not include programming specific source addresses or providing different data links for the plurality of common keypads.

4. The method of claim 1, wherein for a one of the plurality of common keypads, associating over the common data link includes calibrating the one of the plurality of common keypads so as to be associated by one of the plurality of displays or the controller with an identifier and one of the plurality of displays.

5. The method of claim 4, wherein the calibrating includes:
opening a menu of the one of the plurality of displays;
actuating one of the plurality of common keypads to communicate a calibration signal over the common data link;
recognizing the calibration signal associated with one of the plurality of common keypads and the one of the plurality of displays; and
saving data regarding the association between the calibration signal and one of the plurality of common keypads.

6. The method of claim 5, wherein the data comprises the identifier of one of the plurality of common keypads.

7. The method of claim 1, wherein the controller, the plurality of common keypads and the plurality of displays are all carried by the paving machine.

8. The method of claim 1, wherein the controller comprises an electronic control module.

9. The method of claim 8, wherein one of the plurality of displays and the at least one of the plurality of common keypads comprise a unit having a dedicated unit controller configured to communicate with the electronic control module over the common data link.

10. A system for enabling use of a plurality of common keypads on a paving machine, the system comprising:
the paving machine having a plurality of displays and the plurality of common keypads for use with the plurality of displays, wherein at least one of the plurality of displays and at least one of the plurality of common keypads are located in a driver cabin of the paving machine and at least another of the plurality of displays and at least another of the plurality of common keypads are located on a side of the paving machine, the plurality of common keypads having a same hardware configuration and a same firmware configuration as one another;
a common data link shared by the plurality of displays and the plurality of common keypads; and a controller configured to communicate over the common data link with the plurality of common keypads and the plurality of displays, wherein the controller is configured to be calibrated to associate a one of the plurality of displays with at least one of the plurality of common keypads.

11. The system of claim 10, wherein the plurality of common keypads include a first group of common keypads and a second group of common keypads, and wherein associating over the common data link one of the plurality of displays includes associating one of the plurality of displays with at least one of the first group of common keypads and at least one of the second group of common keypads.

12. The system of claim 10, wherein enabling the use of the plurality of common keypads does not include programming specific source addresses or providing different data links for the plurality of common keypads.

13. The system of claim 10, wherein for a one of the plurality of common keypads, the one of the plurality of common keypads are calibrated so as to be associated by one of the plurality of displays or the controller with an identifier and one of the plurality of displays.

14. The system of claim 13, wherein one of the plurality of common keypads are calibrated by the one of the plurality of displays or the controller recognizing a calibration signal associated with one of the plurality of common keypads and one of the plurality of displays, and saving data regarding the association between the calibration signal and one of the plurality of common keypads.

15. The system of claim 14, wherein the data comprises the identifier of one of the plurality of common keypads.

16. The of claim 10, wherein the controller comprises an electronic control module.

17. The system of claim 16, wherein one of the plurality of displays and the at least one of the plurality of common keypads comprise a unit having a dedicated unit controller configured to communicate with the electronic control module over the common data link.

18. The system of claim 10, wherein the controller, the plurality of common keypads and the plurality of displays are all carried by the paving machine.

19. A non-transitory computer-readable storage medium storing a set of instructions that, when executed by at least one processor of a machine having a plurality of common keypads and a plurality of displays, the plurality of common keypads having a same hardware configuration and a same firmware configuration as one another, cause the machine to:
receive, over a common data link shared by all of the plurality of common keypads and the plurality of displays, a calibration signal from one of the plurality of common keypads;
recognize the calibration signal associated with one of the plurality of common keypads and one of the plurality of displays;
save data regarding the association between the calibration signal and one of the plurality of common keypads; and
enable use of one of the plurality of common keypads with one of the plurality of displays.

20. The non-transitory computer-readable storage medium of claim 19, wherein the instructions further cause the machine to: save the data as an identifier of one of the plurality of common keypads.

* * * * *